July 25, 1933. C. SAURER 1,919,484
SHOCK INSULATOR
Filed Aug. 22, 1930 2 Sheets-Sheet 2
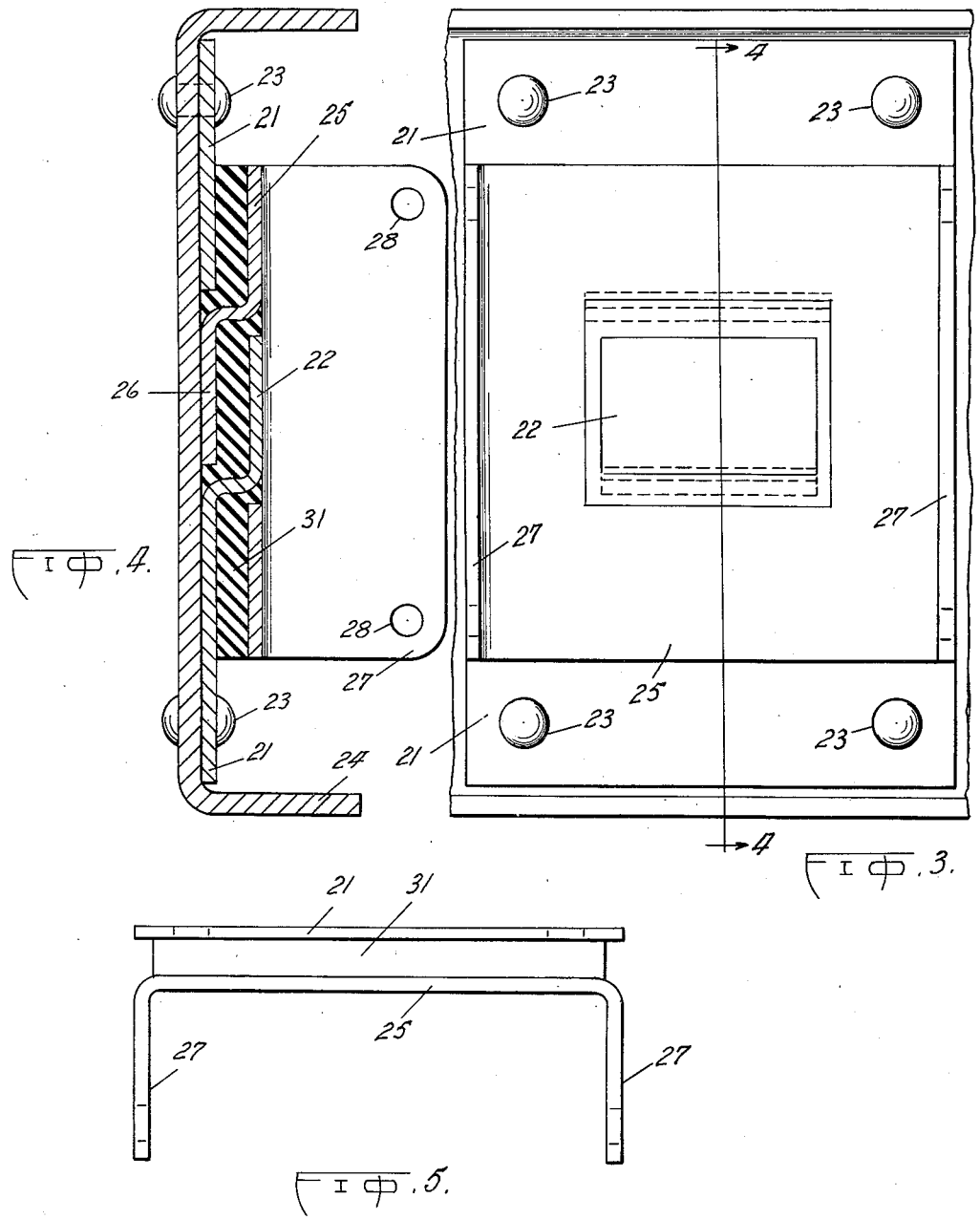
INVENTOR
CURT SAURER
BY
ATTORNEYS.

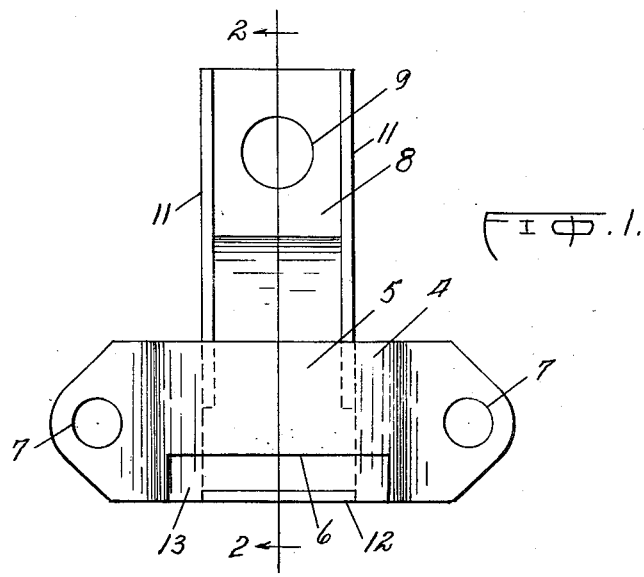
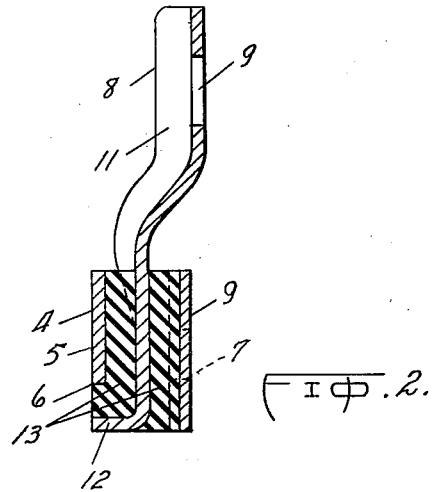

Patented July 25, 1933

1,919,484

UNITED STATES PATENT OFFICE

CURT SAURER, OF AKRON, OHIO, ASSIGNOR TO THE FIRESTONE TIRE & RUBBER COMPANY, OF AKRON, OHIO, A CORPORATION OF OHIO

SHOCK INSULATOR

Application filed August 22, 1930. Serial No. 477,180.

This invention relates to rubber shock and vibration insulators and more particularly to rubber motor supports.

The general purpose of the invention is to provide inexpensive, efficient shock or vibration absorbers or insulators which are particularly adapted for use as front and back motor supports on an automobile or the like.

A further purpose of the invention is the provision of a positive stop or limit of the movement between the respective plates of the insulator so that even if the rubber therein fails the insulated members cannot move completely apart.

The above and other objects of the invention are achieved by the device illustrated in the accompanying drawings, it being understood that the invention is not limited to the exact details thereof shown and described.

In the drawings:

Figure 1 is a side elevation of an insulator embodying one form of the invention.

Figure 2 is a vertical section taken on line 2—2 of Figure 1.

Figure 3 is an elevation of an insulator embodying a second form of the invention.

Figure 4 is a vertical section taken on line 4—4 of Figure 3.

Figure 5 is a plan view of the insulator shown in Figure 3.

Referring to the Figures 1 and 2 of the drawings the numeral 4 indicates a metal strap or plate which is formed with a raised central portion 5, the bottom of which is cut away as at 6.

The ends of the strap are provided with suitable means such as holes 7 to permit the strap to be fastened to one of the members to be insulated. The strap is preferably provided with a flat back plate 9 having holes aligned with the holes 7 in the strap.

Cooperating with the strap 4 is a hanger 8 which is formed with a suitable means such as hole 9 whereby it can be secured to the other of the members to be insulated. The hanger 8 may be strengthened with side flanges 11 and is formed with a bottom flange 12 which is adapted to engage with the top of the cutaway portion 6 of the strap to positively limit the relative movement between the strap and the hanger.

A rubber shock absorbing cushion 13 is vulcanized between the adjacent faces of the back plate 9, strap and hanger, which parts are of suitable metal or which may be suitably plated or coated to insure a good weld between them and the rubber.

This type of insulator is particularly adapted for use as a front support between an automobile frame and its motor.

The second embodiment of the invention, illustrated in Figures 4, 5 and 6, includes a hanger plate 21 which is formed with a central louver or bent out flange 22. The plate 21 is extended at its top and bottom and may be fastened by suitable means such as rivets 23 to a channel iron 24.

An opposed bracket plate 25 formed with a similar but reversely positioned louver or flange 26 cooperates with the hanger plate 21. Side flanges 27, suitably apertured as at 28, for fastening means, are preferably formed integrally with the plate 25.

A rubber cushion or pad 31 is vulcanized to and between the plates 21 and 25. This type of insulator is particularly adapted to support the back end of an automobile motor in the car frame.

In both types of insulators the hanger is secured to one part or member, such as the frame of an automobile when the insulator is used as a motor support, and the opposed plate is secured to the other member, such as the motor in the adaption of the insulators above mentioned. It will be seen that in both types of insulators the stress imposed upon the rubber will be a combination of compression, shear and tension and that it will be impossible for the hanger and opposed plate to separate even if the rubber fails.

As many changes could be made in the construction, it is intended that all matter contained in the above description or shown in the accompanying drawings shall be interpreted as illustrative only and not in a limiting sense, accordingly various modifications and applications of the invention can be resorted to without departing from the spirit of the invention or the scope of the appended claims.

What is claimed is:

1. A shock insulator comprising a hanger, a horizontal flange on said hanger, a strap plate fitting over said hanger, a back plate on said strap plate, and a rubber pad vulcanized to and between the plates and hanger and resiliently securing them together, said strap plate being formed with a cut-away portion in which the flange of the hanger rides.

2. A shock insulator comprising a hanger, a flange on said hanger, a strap plate fitting over said hanger, and a rubber pad vulcanized to and between the plate and hanger and resiliently securing them together, said strap plate being formed with a cut-away portion in which the flange of the hanger rides.

3. A shock insulator comprising a plate, a louver-like flange having a vertical portion and a horizontal portion and open sides on said plate, a hanger, an inverted louver-like flange having a vertical portion and a horizontal portion and open side on said hanger, said louver-like flanges interlocking one behind the other, and a rubber pad vulcanized to and between said flanges and said plate and hanger.

4. A shock insulator comprising a plate, a louver-like flange having a vertical portion on said plate, a hanger, an inverted louver-like flange having a vertical portion on said hanger, said louver-like flanges interlocking one behind the other, and a rubber pad vulcanized to and between said flanges and said plate and hanger.

5. A shock insulator comprising a plate, a louver-like flange having a horizontal portion on said plate, a hanger, an inverted louver-like flange having a horizontal portion on said hanger, said louver-like flanges interlocking, and a rubber pad vulcanized to and between said flanges and said plate and hanger.

6. A rubber shock insulator comprising a pair of substantially parallel plates, a rubber pad vulcanized to and between said plates, one of said plates being formed with an opening in the side thereof, the other of said plates being formed with an angular extension projecting through said opening, said projection and the portion of the plate formed with said opening affording an interlocking safety means to prevent undue separation and movement of the plates when a load is applied tending to move the plates in parallel planes relatively to each other.

CURT SAURER.